Patented Jan. 15, 1929.

1,698,884

UNITED STATES PATENT OFFICE.

ERWIN HOFFA, ERWIN THOMA, AND HANS HEYNA, OF HOCHST-ON-THE-MAIN, GERMANY, ASSIGNORS TO GRASSELLI DYESTUFF CORPORATION, OF NEW YORK, N. Y., A CORPORATION OF DELAWARE.

AZO DYESTUFFS AND PROCESS FOR PREPARING THEM.

No Drawing. Application filed July 11, 1927, Serial No. 205,031, and in Germany July 21, 1926.

The present invention relates to new azo dyestuffs and to a process of preparing the same.

There are known only a few bases which when coupled in the form of their diazo-compounds with arylides of the 2-hydroxynaphthalene-3-carboxylic acid yield dyestuffs which satisfy sufficiently all requirements as regards fastness to kier-boiling.

We have found that by coupling a 2.5 dimethyl-4-halogen-1-diazo-benzene in which one of the hydrogen atoms standing in 3 and 6 position is replaced by a further halogen with an arylamide of 2-hydroxynaphthalene-3-carboxylic acid new azo dyestuffs of the following formula:

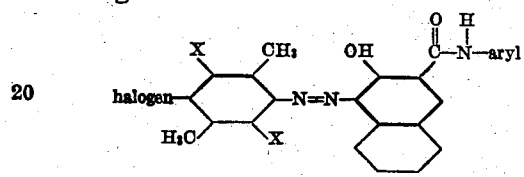

wherein one X stands for hydrogen, the other X stands for a halogen atom, and the term aryl represents an aryl nucleus which does not contain a hydroxyl group or a group containing a hydroxyl group as for instance the carboxylic acid group, are obtainable the fastness of which to kier-boiling surpasses that of any other dyestuffs of this class, including those made from other dichlorinated bases, as for instance from 2.5-dichloraniline. The components can be coupled either in substance or on the fiber, or in the presence of any of the usual substrata.

The following examples illustrate the invention, but they are not intended to limit it thereto:

(1) Cotton material is padded in the usual manner with a grounding liquor prepared from 12 kilos of 2-hydroxynaphthalene-3-carboxylic acid-2'-methyl-4'-chloro-1'-anilide, 36 liters of caustic soda solution of 34° Bé., 24 liters of sodium Turkey red oil of 50 per cent strength, 500 liters of hot water, the whole being made up with water to 1000 liters.

The dyeing is then developed with a diazo-solution prepared as follows:—3.8 kilos of 2:5-dimethyl-4:6-dichloro-1-aniline are mixed, while stirring, with 5.2 liters of hydrochloric acid of 22° Bé. and some ice-cold water, and to the mixture are added 1.44 kilos of sodium nitrite dissolved in water. After the diazotization is complete the mass is made up with cold water to 1000 liters and neutralized with sodium acetate until it shows a neutral reaction towards congo paper. After washing and soaping at the boil the dyeing shows a bright red tint of good fastness to chlorine and kier-boiling the dyestuff has the probable formula:

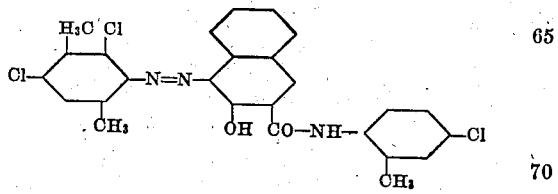

The 2:5-dimethyl-4:6-dichloro-1-aniline (melting point 47° C. to 48° C.) can be made by saponifying the 1-acetyl-amino-2:5-dimethyl-4:6-dichlorobenzene (melting point 169° C. to 170° C.; cf. Alvin S. Wheeler and Mildred Morse "Journal of the American Chemical Society" 46, 2572-2576; Chemisches Centralblatt 1925, I, 380, melting point 167° C.) or by chlorinating mineral salts of 1-amino-2:5-dimethylbenzene in organic solvents.

(2) Cotton material is padded with a grounding liquor prepared from 12 kilos of 2-hydroxynaphthalene-3-carboxylic acid-3-naphthylide, 36 liters of caustic soda solution of 34° Bé., 24 liters of sodium Turkey red oil of 50 per cent strength, 500 liters of hot water, the whole being made up with water to 1000 liters.

The dyeing is then developed with a diazo-solution prepared as follows: 3.8 kilos of 2:5-dimethyl-3:4-dichloro-1-aniline are mixed, while stirring, with 5.2 liters of hydrochloric acid of 22° Bé. and ice-cold water, and to the mixture are added 1.44 kilos of sodium nitrite dissolved in water. After the diazotization is complete, the whole is made up with cold water to 1000 liters and neutralized with sodium acetate until the mass shows a neutral reaction towards congo paper. After washing and soaping at the boil the dyeing shows a bluish-red tint of good fastness to chlorine and kier-boiling the dyestuff has the probable formula:

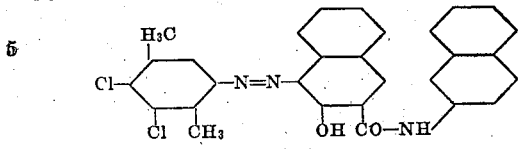

The 2.5-dimethyl-3.4-dichloro-1-aniline has a melting point of 78° C. to 79° C.; it can be obtained for instance by chlorinating the 2.5-dimethyl-1-aniline or the 2.5-dimethyl-4-chloro-1-aniline in sulfuric acid.

If in the foregoing example for the 12 kilos of 2-hydroxynapthalene-3-carboxylic acid-3-naphthylide are substituted 11.8 kilos of 2-hydroxynaphthalene-3-carboxylic acid-4'-methoxy-1'-anilide or 12 kilos of 2-hydroxynaphthalene-3-carboxylic acid-2'-methoxy-1'-anilide alizarin tints are obtained of an excellent fastness to light.

In the following claims the term "unhydroxylated aryl" is intended to comprise all such aryl nuclei which do not contain a hydroxyl group or a group containing a hydroxyl group as for instance the carboxylic acid group. The aryl nuclei containing a hydroxyl group are to be excluded from the claims, in so far as the dyestuffs containing a hydroxylated aryl nucleus are not fast to kier boiling as is the object of this invention.

We claim:

1. As new products the azo dyestuffs of the following formula:

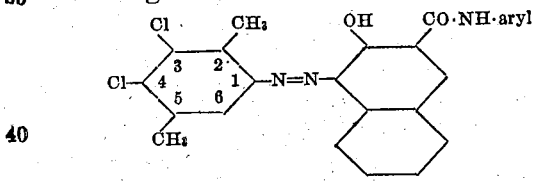

wherein aryl represents an unhydroxylated aryl nucleus being yellowish-red to bluish-red and yellowish-red to brownish-red powders and yielding when produced on the fiber dyeings of excellent properties as to fastness.

2. As a new product, the azo dyestuff of the following formula:

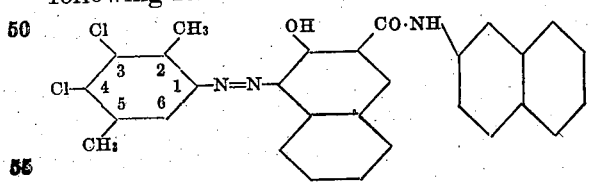

being a bluish-red powder and yielding when produced on the fiber a bluish-red dyeing of an excellent fastness as to kier-boiling.

3. As new products the azo dyestuffs of the following formula:

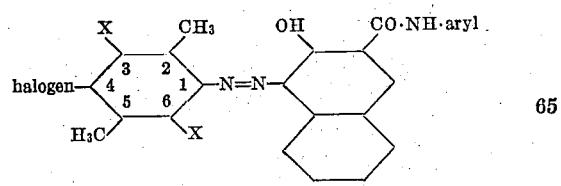

wherein aryl represents an unhydroxylated aryl nucleus one X represents hydrogen and the other X represents halogen, being yellowish-red to brownish-red and yellowish-red to bluish-red powders and yielding when produced on the fiber dyeings of excellent properties as to fastness.

4. As new products the azo dyestuffs of the following formula:

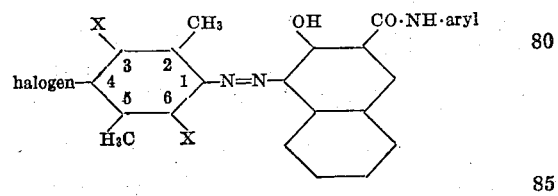

wherein aryl represents an aryl nucleus of the benzene or naphthalene series which may be substituted by halogen, alkyl or alkoxy, one X represents hydrogen and the other X represents halogen.

5. As new products the azo dyestuffs of the following formula:

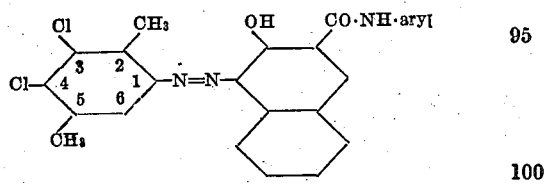

wherein aryl represents an aryl nucleus of the benzene or naphthalene series which may be substituted by halogen, alkyl or alkoxy.

In testimony whereof, we affix our signatures.

ERWIN HOFFA.
ERWIN THOMA.
HANS HEYNA.

CERTIFICATE OF CORRECTION.

Patent No. 1,698,884. Granted January 15, 1929, to

ERWIN HOFFA ET AL.

It is hereby certified that error appears in the printed specification of the above numbered patent requiring correction as follows: Page 1, line 85, after the word "acid" strike out the numeral "3" and insert instead the Greek letter "B"; page 2, line 17, before the word "naphthylide" strike out the numeral "3" and insert instead the Greek letter "B"; and that the said Letters Patent should be read with these corrections therein that the same may conform to the record of the case in the Patent Office.

Signed and sealed this 19th day of February, A. D. 1929.

M. J. Moore,
(Seal) Acting Commissioner of Patents.